United States Patent
Nors

(10) Patent No.: US 11,362,927 B2
(45) Date of Patent: *Jun. 14, 2022

(54) METHODS, SWITCH AND FRAME CAPTURE MANAGING MODULE FOR MANAGING ETHERNET FRAMES

(71) Applicant: Telefonaktiebolaget LM Ericsson (publ), Stockholm (SE)

(72) Inventor: Niclas Nors, Mjölby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 49 days.

This patent is subject to a terminal disclaimer.

(21) Appl. No.: 16/917,900

(22) Filed: Jun. 30, 2020

(65) Prior Publication Data

US 2020/0336403 A1 Oct. 22, 2020

Related U.S. Application Data

(63) Continuation of application No. 16/306,510, filed as application No. PCT/SE2016/050610 on Jun. 22, 2016, now Pat. No. 10,708,165.

(51) Int. Cl.
*H04L 12/26* (2006.01)
*H04L 43/50* (2022.01)
(Continued)

(52) U.S. Cl.
CPC ............ *H04L 43/50* (2013.01); *H04L 43/026* (2013.01); *H04L 43/028* (2013.01);
(Continued)

(58) Field of Classification Search
CPC ....... H04L 43/50; H04L 43/026; H04L 43/12; H04L 43/028
See application file for complete search history.

(56) References Cited

U.S. PATENT DOCUMENTS

2012/0278898 A1* 11/2012 Nguyen ................. G06F 21/10
726/27
2014/0016482 A1 1/2014 De Silva
(Continued)

FOREIGN PATENT DOCUMENTS

EP 1289191 A1 * 3/2003 ......... H04L 43/0894
EP 1289191 A1 3/2003

OTHER PUBLICATIONS

Communication pursuant to Article 94(3) EPC for EP Application No. 16744577.4, dated Sep. 25, 2019, 5 pages.
(Continued)

*Primary Examiner* — Jamal Javaid
(74) *Attorney, Agent, or Firm* — NDWE LLP

(57) ABSTRACT

A switch and a Frame Capture Managing Module (FCMM) for managing Ethernet frames. The FCMM receives a request for capturing Ethernet frames at a network interface of the switch. The request comprises an identity of the network interface and information relating to a second filter indicating Ethernet frames for monitoring by the network node. The FCMM sends to the switch, a configuration comprising the identity of the network interface of the switch, an indication about a first multicast channel, and information relating to a first filter. The FCMM sends a response comprising a second multicast channel relating to the first multicast channel. Furthermore, the switch receives a request for receiving Ethernet frame sent to the first multicast channel. The switch filters, by use of the first filter, received Ethernet frames into a collection of Ethernet frames. The switch sends the collection of Ethernet frames on the first multicast channel.

14 Claims, 4 Drawing Sheets

(51) Int. Cl.
*H04L 43/026* (2022.01)
*H04L 47/10* (2022.01)
*H04L 43/062* (2022.01)
*H04L 43/028* (2022.01)
*H04L 43/12* (2022.01)

(52) U.S. Cl.
CPC ............ *H04L 43/062* (2013.01); *H04L 43/12* (2013.01); *H04L 47/15* (2013.01)

(56) References Cited

U.S. PATENT DOCUMENTS

2014/0189050 A1* 7/2014 Rijsman .............. H04L 47/2408
709/217
2015/0312171 A1 10/2015 Gallatin et al.

OTHER PUBLICATIONS

International Preliminary Report on Patentability for International Application No. PCT/SE2016/050610, dated Jan. 3, 2019, 10 pages.
International Search Report and Written Opinion for International Application No. PCT/SE2016/050610, dated Feb. 8, 2017, 11 pages.
Non-Final Office Action, U.S. Appl. No. 16/306,510, dated Dec. 2, 2019, 8 pages.
Notice of Allowance, U.S. Appl. No. 16/306,510, dated Apr. 9, 2020, 5 pages.

* cited by examiner

METHODS, SWITCH AND FRAME CAPTURE MANAGING MODULE FOR MANAGING ETHERNET FRAMES

CROSS-REFERENCE TO RELATED APPLICATIONS

This application is a continuation of U.S. application Ser. No. 16/306,510, filed Nov. 30, 2018, which is a National stage of International Application No. PCT/SE2016/050610, filed Jun. 22, 2016, which are all hereby incorporated by reference.

TECHNICAL FIELD

Embodiments herein relate to computer networks. In particular, a method and a switch for managing Ethernet frames as well as a method and a Frame Capture Managing Module for managing capturing of Ethernet frames by the switch are disclosed. Corresponding computer programs and computer program carriers are also disclosed.

BACKGROUND ART

A known type of computer networks are referred to as Ethernet based computer networks. In these networks, a common troubleshooting technique is to analyse packets in the network by means of packet capture/packet sniffing. In this manner, faults and/or problems may be found or it can be validated that certain traffic flows, including packets and frames that are analysed, are correct.

A known Ethernet network comprises switches and routers that connect applications, such as servers, clients and the like, to each other. Packet analysing requires that packet flows between the applications are intercepted, in order to make copies of the packets, or frames, and send these packets for analyse. As a packet goes from one application to another, it passes on wires of a path, such as an Internet Protocol (IP) path, between the applications. In order to capture the packets passing on the path, the path must be intercepted or some device, known as packet taps, must already be present in the path.

Usually, packet taps are not installed at every possible location, on every possible path in the network. Therefore, it is typically required to insert equipment, such as the aforementioned packet tap, on the path in order to capture and forward the traffic for analyse. The packet tap is often inserted at a location in quite close proximity of computer servers and switches in the path of the Ethernet traffic to be analysed.

A problem is hence that e.g. the switch needs to be physically visited in order to correctly connect a wire between the switch and the analysing tool. This is of course costly and time consuming.

SUMMARY OF THE INVENTION

An object may be to overcome, or at least alleviate, the problem mentioned above.

According to an aspect, the object is achieved by a method, performed by a switch, for managing Ethernet frames. The switch receives, from a Frame Capture Managing Module, a configuration comprising: —an identity of a network interface of the switch, —an indication of a first multicast channel, and —information relating to a first filter to be applied, by the switch, to Ethernet frames received at the network interface. The switch receives a request for receiving Ethernet frame sent to the first multicast channel. The switch receives the Ethernet frames at the network interface. The switch filters, by use of the first filter, the Ethernet frames into a collection of Ethernet frames. The switch sends the collection of Ethernet frames on the first multicast channel.

According to another aspect, the object is achieved by a switch configured for managing Ethernet frames. The switch is configured for receiving, from a Frame Capture Managing Module, a configuration comprising: —an identity of a network interface of the switch, —an indication of a first multicast channel, and —information relating to a first filter to be applied, by the switch, to Ethernet frames received at the network interface.

Moreover, the switch is configured for receiving a request for receiving Ethernet frame sent to the first multicast channel.

Furthermore, the switch is configured for receiving the Ethernet frames at the network interface. The switch is configured for filtering, by use of the first filter, the Ethernet frames into a collection of Ethernet frames.

Additionally, the switch is configured for sending the collection of Ethernet frames on the first multicast channel.

According to a further aspect, the object is achieved by a method, performed by a Frame Capture Managing Module, for managing capturing of Ethernet frames by a switch. The Frame Capture Managing Module receives, from a network node, a request for capturing Ethernet frames at a network interface of the switch. The request comprises an identity of the network interface and information relating to a second filter indicating Ethernet frames to be received at the network node. The Frame Capture Managing Module sends, to the switch, a configuration comprising: —the identity of the network interface of the switch, —an indication about a first multicast channel, and —information relating to a first filter to be applied, by the switch, to Ethernet frames received at the network interface. The first filter relates to the second filter. The Frame Capture Managing Module sends, to the network node, a response comprising a second multicast channel relating to the first multicast channel. The second multicast channel is to be joined by the network node, whereby the network node, upon joining the second multicast channel, receives a collection of Ethernet frames, indicated the second filter, from among Ethernet frames received at the switch.

According to yet another aspect, the object is achieved by a Frame Capture Managing Module configured for managing capturing of Ethernet frames by a switch. The Frame Capture Managing Module is configured for receiving, from a network node, a request for capturing Ethernet frames at a network interface of the switch. The request comprises an identity of the network interface and information relating to a second filter indicating Ethernet frames to be received at the network node.

Furthermore, the Frame Capture Managing Module is configured for sending, to the switch, a configuration comprising: —the identity of the network interface of the switch, —an indication about a first multicast channel, and —information relating to a first filter to be applied, by the switch, to Ethernet frames received at the network interface, wherein the first filter relates to the second filter.

Moreover, the Frame Capture Managing Module is configured for sending, to the network node, a response comprising a second multicast channel relating to the first multicast channel. The second multicast channel is to be joined by the network node, whereby the network node, upon joining the second multicast channel, receives a collection of Ethernet frames, indicated by the second filter, from among Ethernet frames received at the switch.

According to further aspects, the object is achieved by computer programs and computer program carriers corresponding to the aspects above.

The Frame Capture Managing Module receives, from the network node, the request for capturing Ethernet frames. In this manner, the embodiments herein enable dynamic creation of a so called packet tap at a point in the network as given by the identity of the network interface. The point in the network may thus be any point identifiable by the identity. Moreover, the information relating to the second filter allows e.g. a network operator to dynamically define which Ethernet frames to be received at the network node. In order to effectuate the request from the network node, the request typically being initiated by the network operator, the Frame Capture Managing Module sends the configuration, comprising the identity, the indication about a first multicast channel, and the information relating to the first filter, to the switch. The first filter is related to the second filter e.g. in that the first filter is the second filter or in that the first filter is different from the second filter. In this fashion, the switch is dynamically configured to filter Ethernet frames received at the network interface and to send the filtered Ethernet frames, i.e. the collection of Ethernet frames, onto the first multicast channel. Moreover, the Frame Capture Managing Module sends a response, comprising the second multicast channel to the network node. As a result, the network node is made aware of that the second multicast channel is to be joined by the network node in order to receive the collection of Ethernet frames, which may be monitored and/or analysed by the network node, or rather an analysing tool executed in the network node. In some examples, the second multicast channel is the first multicast channel.

An advantage is thus that the embodiments herein enable dynamic configuration of any switch, i.e. any point in the network, to act as a packet tap, from the network node, which represents any remote location in the network. In this manner, existing network infrastructure is re-used. This means that the embodiments allow for orchestration via software, such as a computer program according to the embodiments herein. Therefore, the embodiments herein may be used in networks where on-demand packet analytics is required at any point in the network.

In view of the above, cost of dedicated packet capture equipment or taps is avoided. Moreover, site visits for installation of such equipment or taps are also avoided. Hence, further cost-savings are achieved.

A further advantage is that the embodiments require no physical link-breakage for the configuration of the switch. This is in contrast to the aforementioned known packet taps or other dedicated packet capture equipment.

Yet another advantage is that some embodiments herein may beneficially use existing network capacity. For these embodiments, further savings related to avoidance of investments in network infrastructure are achieved. Thus, the further savings go beyond cost reductions due to avoidance of packet capture equipment and manual labour, e.g. visits. However, a dedicated network for transmission of signalling, such as requests, responses, frames and the like, herein may also be provided.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
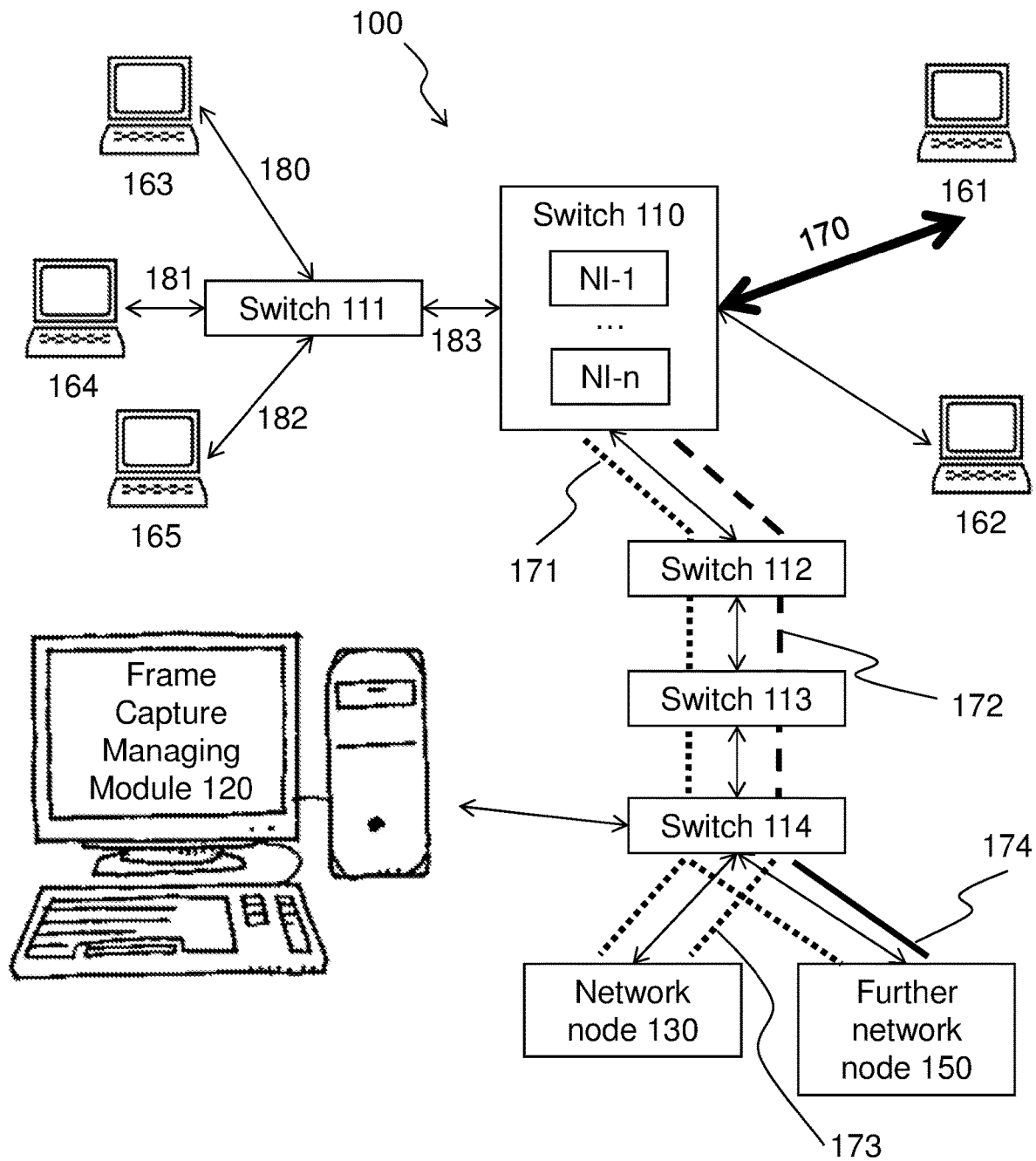
FIG. 1 is a schematic overview of an exemplifying system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying computer network 100 in which embodiments herein may be implemented.

In this example, the computer network 100 implements e.g. an Ethernet layer and an IP layer.

The computer network 100 comprises a plurality of switches 110-114 including a switch 110.

The switch 110 comprises, or manages, a number of network interfaces NI-1-NI-n, wherein n=2, 3, 4, etc. As used herein, the term "network interface" may refer to an external or internal network interface, comprising one or more physical or virtual ports.

The computer network 100 further comprises a Frame Capture Managing Module 120, which is responsible for managing, or orchestrating, Frame Capturing by means of the switch 110 and providing frames captured by the switch 110 to one or more of a network node 130, a further network node 150 and the like.

The network node 130 may include, or execute, an analysing tool as a software application for analysing the frames captured by the switch 110.

Moreover, the computer network 100 comprises a number of computers 161-165, which may act various end points, such as servers, clients or the like.

Below, it will be described how frames on a link 170 may be captured and sent to the network node 130 and/or the further network node 150 according to various flows 171, 172, 173, 174 associated with one or more multicast channels as described in more detail with reference to FIG. 2 below. The flows refer to flows of Ethernet frames. The network node 130 may be located at a remote location compared to the link 170 or even in a completely different network as compared to the link 170. Hence, in general, FIG. 1 illustrates flows 171-174, 180-183 (all arrows are not provided with reference numerals for reasons of simplicity) of Ethernet frames.

An operator at the network node 130 may define the filter(s) of what traffic, or flows, that to be captured. It may be that all traffic on the link 170 should be monitored, but it may also be a smaller subset of the traffic based on typical filtering such as, protocol, MAC address, IP address etc.

The operator may also specify the network interface NI-1, to which the link 170 is connected. The network interface may be based on a local list of interfaces on the network node 130, which represent all the interfaces of interest in the network 100, or in a more orchestrated and coordinated scenario being provided via communication with the Frame Capture Managing Module 120. This may then be done using an Ethernet based protocol over the network 100 as any other traffic in the network 100.

Figure 2:
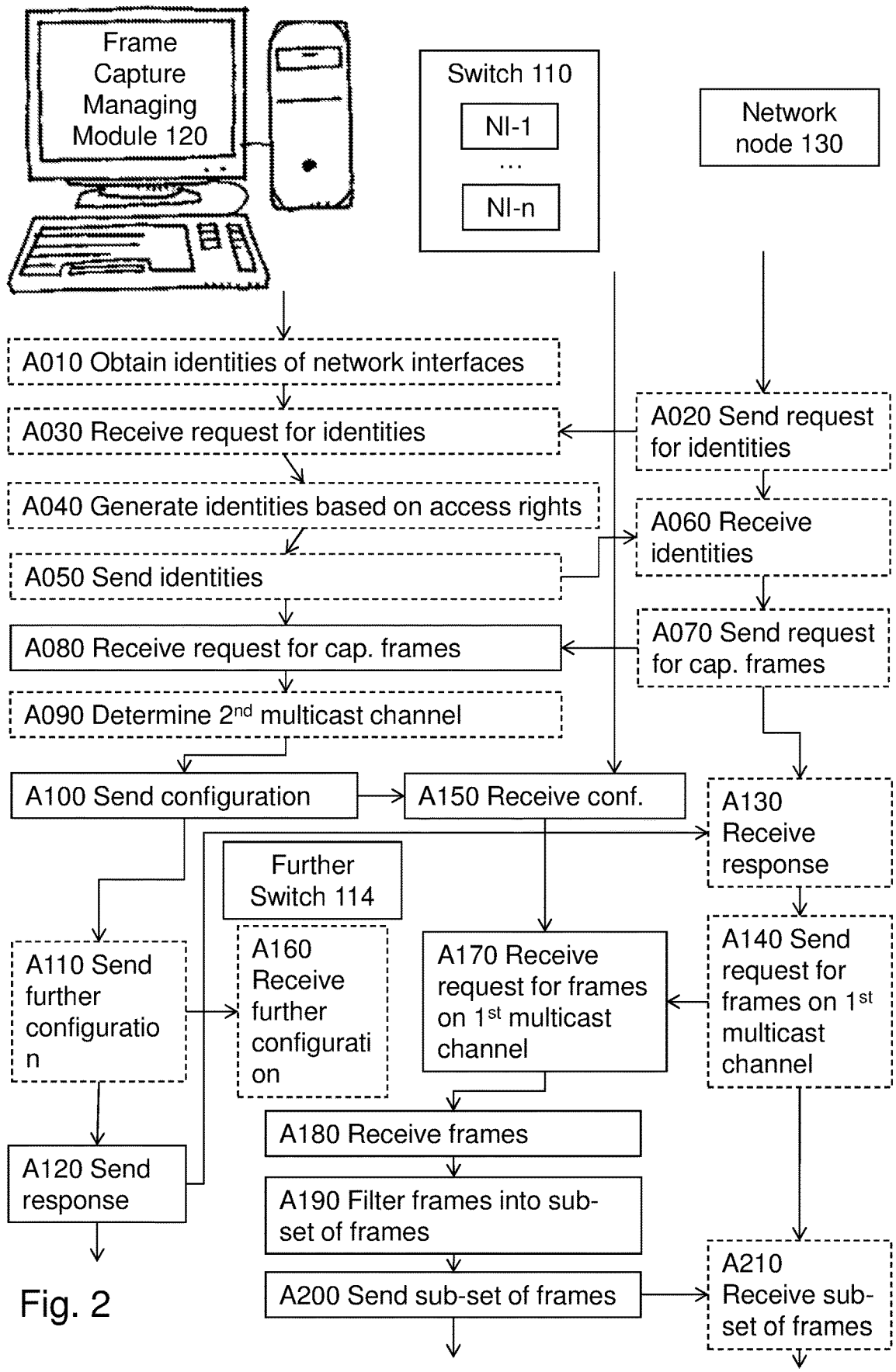
FIG. 2 is a combined signalling and flowchart illustrating the methods herein.

FIG. 2 illustrates exemplifying methods according to embodiments herein when implemented in the computer network 100 of FIG. 1.

The switch 110 performs a method for managing Ethernet frames. The Frame Capture Managing Module 120 performs a method for managing capturing of the Ethernet frames by the switch 110. This means that the Frame Capture Managing Module 120 manages how the switch 110 shall capture the Ethernet frames.

The exemplifying methods described herein after includes a first scenario and a second scenario.

The first scenario relates to when the operator, in this scenario represented by the network node 130, has only requested monitoring according to one filter at one particular network interface of the switch 110. In this first scenario, a first and a second filter referred to below is the same filter.

The second scenario relates to when the operator, in this scenario represented by both the network node 130 and the further network node 150, has requested monitoring according to two different filters at the particular network interface of the switch 110. In the second scenario, the network node 130 and the further network node 150 may be two different analysing tools, executing on the same machine, such as one of the network node 130 and the further network node 150. Additionally, in contrast to the first scenario, the first and second filters are different from each other.

One or more of the following actions may be performed in any suitable order.

Action A010

The Frame Capture Managing Module 120 may obtain a list of identities of the network interfaces NI-1 . . . NI-n of the switch 110. The list may be input by a network operator, i.e. a human with knowledge about the computer network's 100 network interfaces.

The list identities of network interfaces may either already exist in the Frame Capture Managing Module 120, or may be built up on information from an external system, which may in the computer network 100.

Action A020

In order for the network node 130, or rather a user operating the above mentioned analysing tool, to be able to select a network interface, and thus a link, at which frames are to be analysed, the network node 130 may send a request for a set of identities of the network interfaces NI-1 . . . NI-n of the switch 110. The request may pertain to available network interfaces in the computer network 100 in general, i.e. not only to network interfaces of the switch 110. Once the set of identifies is received, as in action A060 below, the interfaces may be displayed in a graphical user interface to the operator, which then is able to make a choice of which network interface to monitor.

Action A030

Subsequent to action A020, the Frame Capture Managing Module 120 may thus receive, from the network node 130, the request.

Action A040

In some examples, the Frame Capture Managing Module 120 may limit the number of identities to be sent to the network node 130 in action A050. Therefore, the Frame Capture Managing Module 120 may generate the set of identities based on access rights of the network node 130. The access rights concerns the network node's 130 right to access the network interfaces of the computer network 100, and in particular the switch 110. Only those network interfaces that the network node 130 has the right to access will be included in the set of identities.

In other examples, the Frame Capture Managing Module 120 may provide all, or almost all, network interfaces in the computer network 100.

Action A050

The set of identities may now thus include all or some of the network interfaces in the computer network 100, or the switch 110. Accordingly, the Frame Capture Managing Module 120 may send, to the network node 130, the set of identities. In view of action A040, the set of identities comprises one or more of the identities of the list obtained in action A010.

Action A060

Subsequent to action A050, the network node may receive the set of identities. As mentioned above, the operator may now select to monitor Ethernet frames received at a certain interface.

Action A070

Once the user of the analysing tool has selected a link or a network interface from among the set of identities of network interfaces, the network node 130 may send a request for capturing Ethernet frames at the selected network interface NI-1 of the switch 110. The request comprises an identity of the selected network interface NI-1 and information relating to the second filter indicating Ethernet frames to be received at the network node 130. The second filter may thus filter out those Ethernet frames that the operator is interested in.

The identity may be a port number, a physical port number, a logical port number, a Virtual Local Area Network (VLAN) identifier or the like.

The filter may specify some or all of the Ethernet frames to be equal to some selected value, such as number, string or the like. Typically, a particular part of the Ethernet frame, such as a header thereof, is specified by the filter to be equal to, or greater/less than, said some selected value. Said some selected value may be selected by the operator in order such that frames of interest may be received at e.g. the network node 130. As a non-limiting example, the filter may be formatted as follows: ip.dst eq www.mit.edu&&ip.src==192.168.1.1.

Action A080

Subsequent to action A070, the Frame Capture Managing Module 120 receives, from the network node 130, the request for capturing Ethernet frames.

Action A090

According to the first scenario, the Frame Capture Managing Module 120 has not previously received a request for capturing Ethernet frames at the selected network interface NI-1, which request is still active in that Ethernet are captured accordingly. Then, the Frame Capture Managing Module 120 may pick any available multicast channel to act as a first multicast channel to be used by both the switch 110 and the network node 130 as described below. The switch 110 uses the first multicast channel in that the switch 110 may send captured Ethernet frames, as in action A190, onto the first multicast channel. The network node 130 uses the first multicast channel in that the network node 130 may join the first multicast channel in order to receive the captured Ethernet frames. Any available multicast channel refers to that the Frame Capture Managing Module 120 may previously have received one or more requests for capturing Ethernet frames at one or more other network interfaces, which may have caused some multicast channels to be occupied for sending captured Ethernet frames on said some multicast channels. When the network node 130 has joined the first multicast channel, a first flow 171 (see FIG. 1) of the captured Ethernet frames will reach the network node 130.

However, if the Frame Capture Managing Module 120 has previously received a request for capturing Ethernet frames at the selected network interface NI-1, then the Frame Capture Managing Module 120 may need to specify a second multicast channel to be sent with the response in action A120. In this scenario, there is hence a first request that has been received and processed previously and a second request that is presently processed, where both requests pertains to the selected network interface NI-1. Processing of requests refers to one or more of actions A080-A120.

The first request comprises a first identity of the selected network interface NI-1 and information relating to a previous filter to be applied to Ethernet frames received at the selected network interface NI-1.

The second request, i.e. the request received in action A080, comprises the first identity of the selected network interface NI-1 and the information relating to the second filter to be applied to Ethernet frames received at the selected network interface NI-1.

Notably, the first and second requests comprise the first identity, i.e. the first and second requests relates to monitoring of the same link 170. If the information relating to the previous and second filters is identical, then the second multicast channel is the first multicast channel similarly to the first scenario. In this case, action A100 does not need to be performed, and action A120 is performed, but the response may be sent to the further network node 150 in case the second request is sent therefrom.

Otherwise, according to the second scenario, when the information relating to the previous and second filters is not identical, the Frame Capture Managing Module 120 may determine the second multicast channel based on the identity of the network interface and the information relating to the previous and/or second filter(s). In the second scenario, the second multicast channel may thus be any available multicast channel. In more detail, a difference between the information relating to the previous filter and the information relating to the second filter may be used to determine a common filter, i.e. the first filter, to be applied at the switch 110. Thus, the first filter will cause the switch 110 to filter out Ethernet frames, travelling in a second flow 172. The Ethernet frames of the second flow 172 include all Ethernet frames that match the previous or second filters as specified by the information relating to the previous and second filters, or may be even both the previous and second filters. Expressed differently, the first filter may be formed by combining the previous and second filters such that the first filter filters out a union of Ethernet frames, as being filtered out by the respective one of the previous and second filters. If no common filter may be established due to that the previous and second filter are disjoint, i.e. the previous and second filters has no common filtering criteria, embodiments according to the first scenario may be applied. The second scenario will be continued below.

In some examples, the first and second multicast channels may be statically defined, such as predefined.

In some embodiments, the first multicast channel may comprise a first multicast IP address and the second multicast channel may comprise a second multicast IP address.

Action A100

The Frame Capture Managing Module 120 sends, to the switch 110, a configuration comprising:
the identity of the network interface NI-1 of the switch 110,
an indication about the first multicast channel, and
the information relating to the first filter to be applied, by the switch 110, to Ethernet frames received at the network interface.

The first filter relates to the second filter e.g. in that the first filter is the second filter or in that the first filter is different from the second filter as described above.

The information relating to the first filter may, in case of the above mentioned second scenario, be information relating to the common filter.

Action A110

According to the above mentioned second scenario, the Frame Capture Managing Module 120 may send, to a further switch 114 a further configuration comprising:
the indication about the first multicast channel to be joined by the further switch 114,
an indication about the second multicast channel to be used by the further switch 114, and
information relating to a third filter, e.g. to be applied to Ethernet frames received on the first multicast channel.

The third filter may be related to the second filter, e.g. in that the third filter is identical to the second filter and in that the third filter is different from the second filter.

The further switch 114 may be closer in terms of network topology to the network node 130 and/or the further network node 150 than e.g. the switch 110. It may be noted here that FIG. 1 does not illustrate the network topology. In this context, "closer in terms of network topology" may refer to that e.g. the further switch 114 may be closer to the network node 130 than the switch 110 when considering physical wires of the computer network 100.

In this second scenario, the second multicast channel is different from the first multicast channel Since the switch 110 will, in this scenario capture Ethernet frames according to the information relating to the first (common) filter and send these captured Ethernet frames onto the first multicast channel, the further switch 114 needs to further filter the Ethernet frames on the first multicast channel. Typically, the further switch applies the information relating to the second filter, as received in the request of action A070 and without modification, in order to filter out those Ethernet frames that the network node 130, i.e. the operator thereof, is interested in. This means that the third filter is identical to the second filter. However, it may be that the information relating to the third filter is different from the information relating to the second filter, i.e. the third filter is different from the second filter. In particular, filtering performed at the switch 110 according to the information relating to the first (common) filter need not be applied again at the further switch 114. Thus, the third filter may omit filtering already performed by the first filter.

Returning to FIG. 1, in one example, different from the above examples, it is illustrated that according to the first scenario a first flow 171, on the first multicast channel (dotted line) may be received by both the network node 130 and the further network node 150. Moreover, according to the second scenario, a second flow 172, on the second multicast channel, according to the common filter, is received by the further switch 114, which applies the third filter, and mirrors Ethernet frames to the further network node 150 on a third multicast channel. The further switch 114 also applies a fourth filter and mirrors Ethernet frames, on the first multicast channel, to the network node 130. In this manner, the network node 130 may continue to listen to the first multicast channel, while in other examples, an updated response may need to be sent to the network node 130 in order to make the network node receive the Ethernet frames of interest.

Action A120

The Frame Capture Managing Module 120 sends, to the network node 130, a response comprising a second multicast channel relating to the first multicast channel. The second multicast channel is to be joined, e.g. by use of Internet Group Management Protocol (IGMP) join messages, by the network node 130. In this manner, the network node 130, upon joining the second multicast channel, receives a collection of Ethernet frames, indicated by the second filter, from among Ethernet frames received at the switch 110.

According to the first scenario, the second multicast channel relates to the first multicast channel in that the second multicast channel is the first multicast channel and the first filter relates to the second filter in that the first filter is the second filter.

Consequently, according to the above mentioned second scenario, the second multicast channel relates to the first multicast channel in that the second multicast channel is different from the first multicast channel and the first filter is different from the second filter.

Action A130

Subsequently to action A120, the network node 130 receives the response.

Action A140

Thanks to that the network node 130 has received the response, the network node 130 is informed about the second multicast channel to be joined in order to receive the Ethernet frames captured by the switch 110 in action A190.

Therefore, the network node 130 sends a request for receiving Ethernet frame sent to the first multicast channel.

Action A150

Subsequent to action A199, the switch 110 receives, from the Frame Capture Managing Module 120, a configuration comprising:
  an identity of a network interface NI-1 of the switch 110,
  an indication of a first multicast channel, and
  information relating to a first filter to be applied, by the switch 110, to Ethernet frames received at the network interface NI-1.

Now turning to the second scenario, in which the further switch 114 is involved.

Action A160

Subsequent to action A110, the further switch 114 may receive the further configuration. Notably, the configuration of action A100 and the further configuration of action A110 are not identical, i.e. they differ from each other e.g. in that the further configuration does not include the identity of the network interface. In contrast thereto, the further configuration comprises the first multicast channel to be joined by the further switch 114 as well as the second multicast channel to be used by the further switch 114, e.g. in that the further switch is to send captured and filtered Ethernet frames on the second multicast channel.

Action A170

Subsequent to action A140 above, the switch 110 receives the request for receiving Ethernet frame sent to the first multicast channel. In the first scenario, the request is received from the network node 130. In the second scenario, the request is received from the further switch 114.

Action A180

The switch 110 receives the Ethernet frames at the network interface NI-1.

Action A190

The switch 110 filters, by use of the first filter, the Ethernet frames into a collection of Ethernet frames.

In the second scenario, the filter may filter out Ethernet frames according to the information about both the first and second filters.

Action A200

The switch 110 sends the collection of Ethernet frames on the first multicast channel. The collection of Ethernet frames may be received by anyone, i.e. any network device, who has registered, via e.g. IGMP, to receive Ethernet frames. The switch 110 is thus said to mirror the captured Ethernet frames onto the multicast channel.

In many examples, the collection of Ethernet frames is received by the network node 130.

However, in the second scenario, the collection of Ethernet frames is received by the further switch 114 in order to be filtered again, by the further switch 114, and sent, by the further switch 114 on the second multicast channel in order to be received by the network node 130.

Action A210

Subsequent to action A200, the network node 130 may receive the collection of Ethernet frames on the first multicast channel, since the network node 130 joined the first multicast channel according to action A140.

Alternatively, according to the second scenario, the collection of Ethernet frames sent on the first multicast channel may be received by the further switch 114.

The embodiments herein may orchestrate Ethernet frame capturing across the computer network 100 for multiple users, such as the network node 130 and the further network node 150. In some embodiments, coordination over the computer network 100 is ensured. Moreover, some embodiments ensures integrity of the Ethernet frame capturing across multiple users, which may not be allowed to monitor and capture all traffic in the computer network 100.

According to the second scenario, filters are applied in an aggregated way at a top of the network topology, i.e. close to the link to be monitored, to reduce streams of captured Ethernet frames. Next, the Ethernet frames are filtered out to individual users, i.e. the network node 130 and the further network node 150, close to the users for convenience (users do not have to see traffic of non-interest).

The second scenario shows benefits of having only one traffic stream consuming network bandwidth from the link 170 across the computer network 100 down to a closer, or closest, switch 114 nearby the analyzing tool, e.g. executed in the network node 130 and/or the further network node 150. In the second scenario, bandwidth utilization is reduces. However, if bandwidth utilization is of less concern, a single flow from a point of capture, i.e. the switch 110, would be possible.

The embodiments herein may be leveraged in combination with existing network capture and analysing tools, as they purpose how to achieve a Ethernet frame stream, or flow, from a remote location, such as the network node 130. The embodiment herein may be transparent to the network node 130, since the Ethernet frame stream may be seen as any locally captured stream.

Moreover, the embodiments described herein has been shown in a layer 2, Ethernet network, but may also be used in a larger network with layer 2 domains connected by routers. The embodiments herein leverages on existing Multicast protocols to handle registration to streams of Ethernet frames, and uses Multicast for carrying the captured frames. Therefore, the embodiments herein may extend to the same range as known Multicast technology, for example as IPTV services today, may do.

Figure 3:
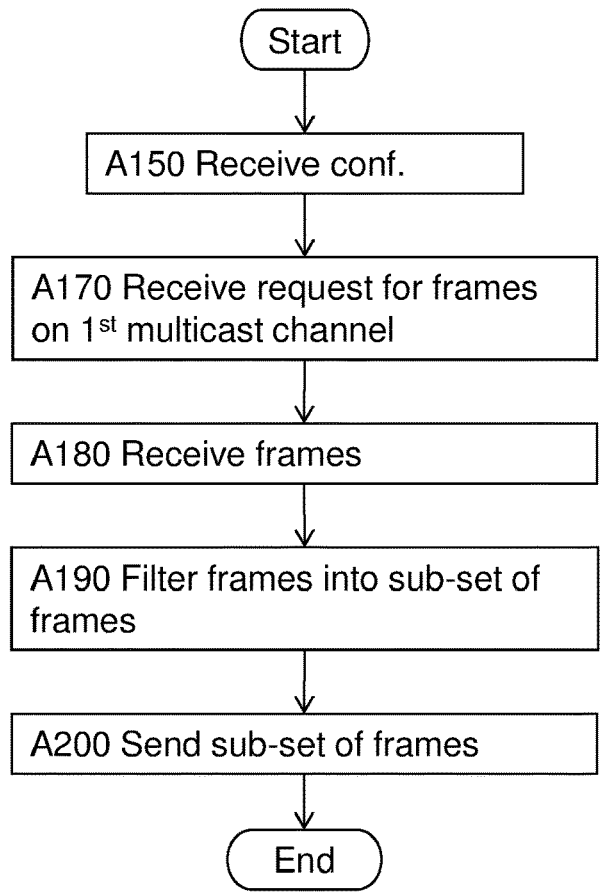
FIG. 3 is a flowchart illustrating embodiments of the method in the switch.

In FIG. 3, a schematic flowchart of exemplifying methods in the switch 110 shown. Again, the same reference numerals as above have been used to denote the same or similar features, in particular the same reference numerals have been used to denote the same or similar actions. Accordingly, the switch 110 performs a method for managing Ethernet frames.

One or more of the following actions may be performed in any suitable order.

Action A150

The switch 110 receives, from a Frame Capture Managing Module 120, a configuration comprising:
 an identity of a network interface NI-1 of the switch 110,
 an indication of a first multicast channel, and
 information relating to a first filter to be applied, by the switch 110, to Ethernet frames received at the network interface NI-1.

In some embodiments, the first multicast channel may comprise a first multicast IP address.

Action A170

The switch 110 receives, e.g. from the network node 130 or the further switch, a request for receiving Ethernet frame sent to the first multicast channel.

Action A180

The switch 110 receives the Ethernet frames at the network interface NI-1.

Action A190

The switch 110 filters, by use of the first filter, the Ethernet frames into a collection of Ethernet frames.

Action A200

The switch 110 sends the collection of Ethernet frames on the first multicast channel. The collection of Ethernet frames may be received by the network node 130.

Figure 4:
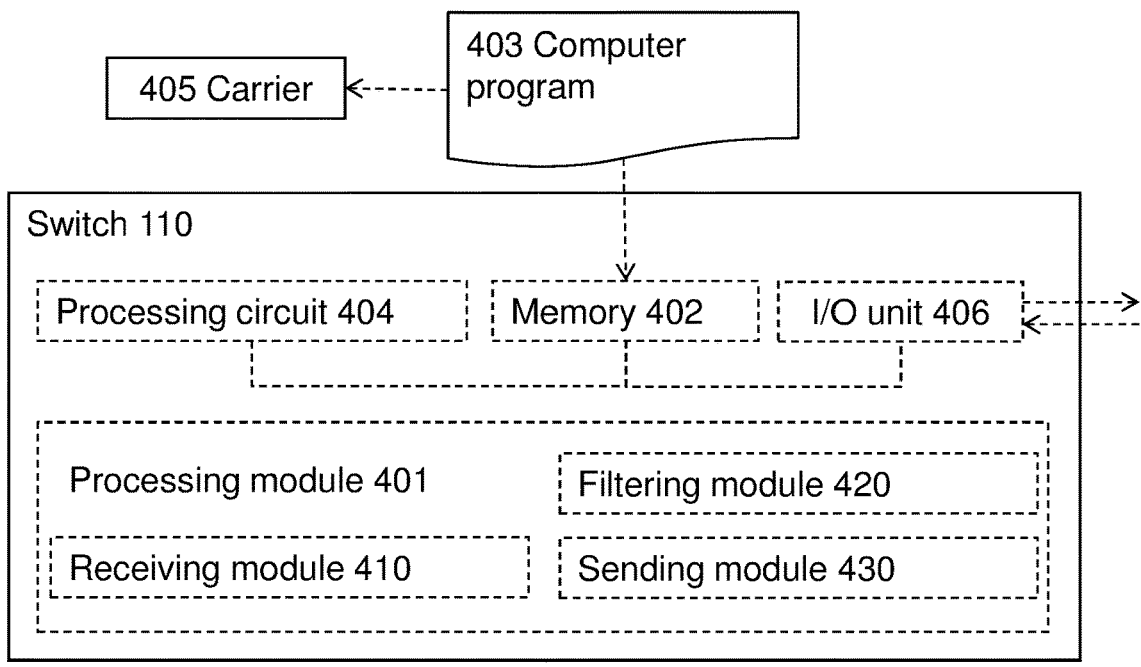
FIG. 4 is a block diagram illustrating embodiments of the switch.

With reference to FIG. 4, a schematic block diagram of embodiments of the switch 110 of FIG. 1 is shown.

The switch 110 may comprise a processing module 401, such as a means for performing the methods described herein. The means may be embodied in the form of one or more hardware modules and/or one or more software modules.

The switch 110 may further comprise a memory 402. The memory may comprise, such as contain or store, instructions, e.g. in the form of a computer program 403, which may comprise computer readable code units.

According to some embodiments herein, the switch 110 and/or the processing module 401 comprises a processing circuit 404 as an exemplifying hardware module. Accordingly, the processing module 401 may be embodied in the form of, or 'realized by', the processing circuit 404. The instructions may be executable by the processing circuit 404, whereby the switch 110 is operative to perform the methods of FIG. 2 and/or FIG. 3. As another example, the instructions, when executed by the switch 110 and/or the processing circuit 404, may cause the switch 110 to perform the method according to FIGS. 2 and/or 3.

FIG. 4 further illustrates a carrier 405, or program carrier, which comprises the computer program 403 as described directly above.

In some embodiments, the processing module 401 comprises an Input/Output module 406, which may be exemplified by a receiving module and/or a sending module as described below when applicable.

In further embodiments, the switch 110 and/or the processing module 401 may comprise one or more of a receiving module 410, a filtering module 420 and a sending module 430 as exemplifying hardware modules. In other examples, one or more of the aforementioned exemplifying hardware modules may be implemented as one or more software modules.

Accordingly, the switch 110 is configured for managing Ethernet frames.

Therefore, according to the various embodiments described above, the switch 110 and/or the processing module 401 and/or the receiving module 410 is configured for receiving, from a Frame Capture Managing Module 120, a configuration comprising:
 an identity of a network interface NI-1 of the switch 110,
 an indication of a first multicast channel, and
 information relating to a first filter to be applied, by the switch 110, to Ethernet frames received at the network interface NI-1.

Moreover, the switch 110 and/or the processing module 401 and/or the receiving module 410 is configured for receiving, e.g. from a network node 130, a request for receiving Ethernet frame sent to the first multicast channel.

Furthermore, the switch 110 and/or the processing module 401 and/or the receiving module 410 is configured for receiving the Ethernet frames at the network interface NI-1.

The switch 110 and/or the processing module 401 and/or the filtering module 420 is configured for filtering, by use of the first filter, the Ethernet frames into a collection of Ethernet frames.

Additionally, the switch 110 and/or the processing module 401 and/or the sending module 430 is configured for sending the collection of Ethernet frames on the first multicast channel. The collection of Ethernet frames may be received by the network node 130.

The first multicast channel may comprise a first multicast IP address.

Figure 5:
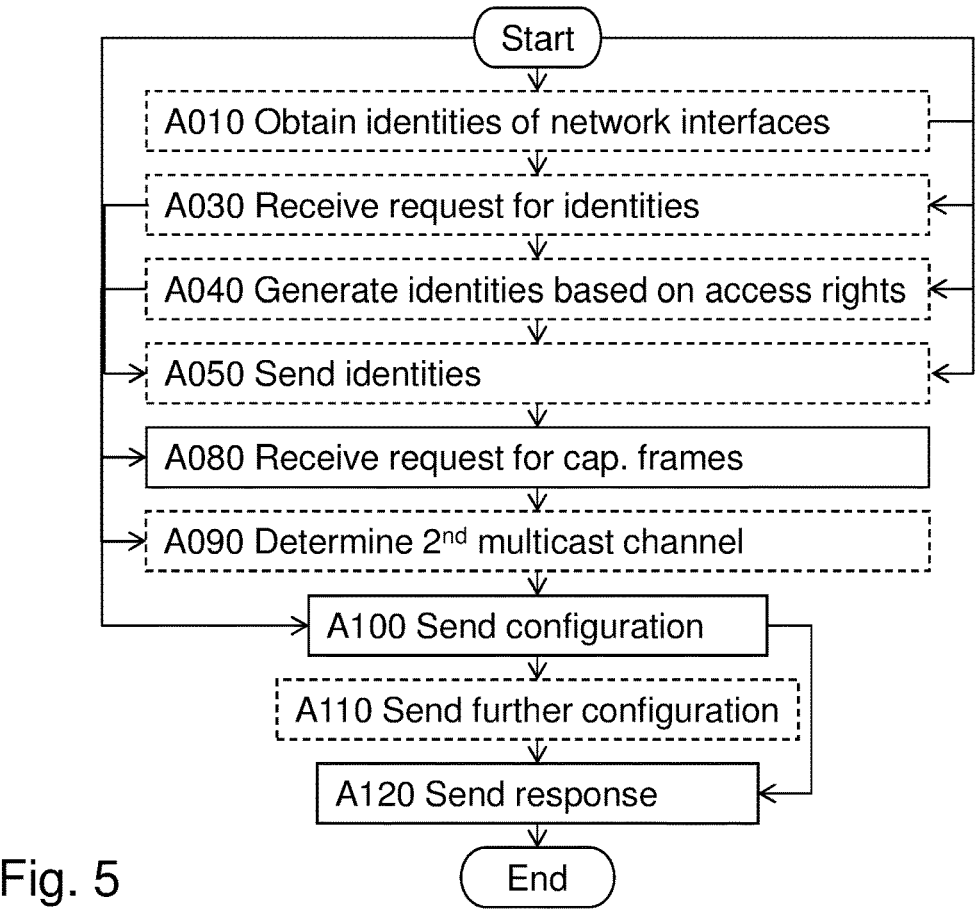
FIG. 5 is a flowchart illustrating embodiments of the method in the Frame Capture Managing Module.

In FIG. 5, a schematic flowchart of exemplifying methods in the Frame Capture Managing Module 120 is shown. Again, the same reference numerals as above have been used to denote the same or similar features, in particular the same reference numerals have been used to denote the same or similar actions. Accordingly, the Frame Capture Managing Module 120 performs a method for managing capturing of Ethernet frames by a switch 110.

One or more of the following actions may be performed in any suitable order.

Action A010

The Frame Capture Managing Module 120 may obtain a list of identities of the network interfaces NI-1 . . . NI-n of the switch 110.

Action A030

The Frame Capture Managing Module 120 may receive, from the network node 130, a request for a set of identities of the network interfaces NI-1 . . . NI-n of the switch 110.

Action A040

The Frame Capture Managing Module 120 may generate the set of identities based on access rights of the network node 130. The access rights concerns right to access the network interfaces.

Action A050

The Frame Capture Managing Module 120 may send, to the network node 130, the set of identities. The set of identities comprises one or more of the identities of the list.

Action A080

The Frame Capture Managing Module 120 receives, from a network node 130, a request for capturing Ethernet frames at a network interface NI-1 of the switch 110. The request comprises an identity of the network interface NI-1 and information relating to a second filter indicating Ethernet frames to be received at the network node 130.

Action A090

The Frame Capture Managing Module 120 may determine the second multicast channel based on the identity of the network interface and the information relating to the first and/or second filter(s).

The first multicast channel may comprise a first multicast IP address and the second multicast channel may comprise a second multicast IP address.

Action A100

The Frame Capture Managing Module 120 sends, to the switch 110, a configuration comprising:
- the identity of the network interface NI-1 of the switch 110,
- an indication about a first multicast channel, and
- information relating to a first filter to be applied, by the switch 110, to Ethernet frames received at the network interface, wherein the first filter relates to the second filter.

Action A110

The Frame Capture Managing Module 120 may send, to a further switch 114 being closer in terms of network topology to the network node 130, a further configuration comprising:
- the indication about the first multicast channel to be joined by the further switch 114,
- an indication about the second multicast channel to be used by the further switch 114, and
- information relating to a third filter.

Action A120

The Frame Capture Managing Module 120 sends, to the network node 130, a response comprising a second multicast channel relating to the first multicast channel. The second multicast channel is to be joined by the network node 130, whereby the network node 130, upon joining the second multicast channel, receives a collection of Ethernet frames, indicated by the second filter, from among Ethernet frames received at the switch 110.

The second multicast channel may be the first multicast channel and the first filter is the second filter. Alternatively, the second multicast channel is different from the first multicast channel and the first filter is different from the second filter.

Figure 6:
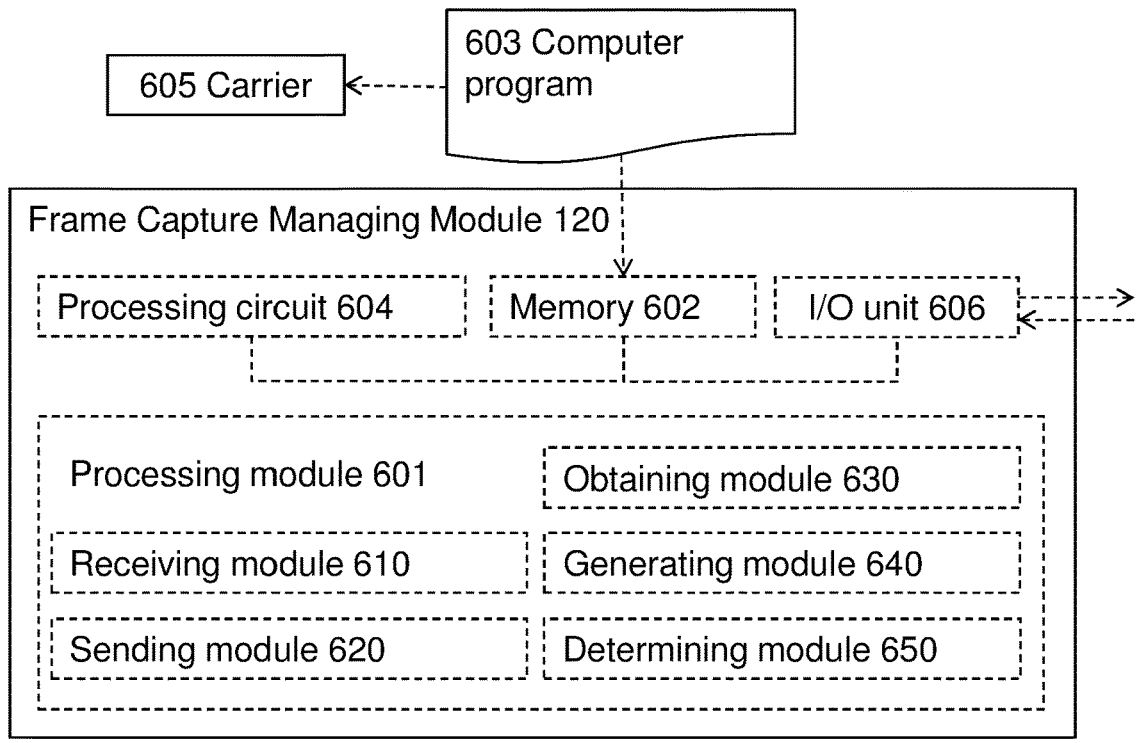
FIG. 6 is a block diagram illustrating embodiments of the Frame Capture Managing Module.

With reference to FIG. 6, a schematic block diagram of embodiments of the Frame Capture Managing Module 120 of FIG. 1 is shown.

The Frame Capture Managing Module 120 may comprise a processing module 601, such as a means for performing the methods described herein. The means may be embodied in the form of one or more hardware modules and/or one or more software modules.

The Frame Capture Managing Module 120 may further comprise a memory 602. The memory may comprise, such as contain or store, instructions, e.g. in the form of a computer program 603, which may comprise computer readable code units.

According to some embodiments herein, the Frame Capture Managing Module 120 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the Frame Capture Managing Module 120 is operative to perform the methods of FIG. 2 and/or FIG. 5. As another example, the instructions, when executed by the Frame Capture Managing Module 120 and/or the processing circuit 604, may cause the Frame Capture Managing Module 120 to perform the method according to FIGS. 2 and/or 5.

FIG. 6 further illustrates a carrier 605, or program carrier, which comprises the computer program 603 as described directly above.

In some embodiments, the processing module 601 comprises an Input/Output module 606, which may be exemplified by a receiving module and/or a sending module as described below when applicable.

In further embodiments, the Frame Capture Managing Module 120 and/or the processing module 601 may comprise one or more of a receiving module 610, a sending module 620, an obtaining module 630, a generating module 640, and a determining module 650 as exemplifying hardware modules. In other examples, one or more of the aforementioned exemplifying hardware modules may be implemented as one or more software modules.

Accordingly, the Frame Capture Managing Module 120 is configured for managing capturing of Ethernet frames by a switch 110.

Therefore, according to the various embodiments described above, the Frame Capture Managing Module 120 and/or the processing module 601 and/or the receiving module 610 is configured for receiving, from a network node 130, a request for capturing Ethernet frames at a network interface NI-1 of the switch 110. The request comprises an identity of the network interface NI-1 and information relating to a second filter indicating Ethernet frames to be received at the network node 130.

The Frame Capture Managing Module 120 and/or the processing module 601 and/or the sending module 620 is configured for sending, to the switch 110, a configuration comprising:
- the identity of the network interface NI-1 of the switch 110,
- an indication about a first multicast channel, and
- information relating to a first filter to be applied, by the switch 110, to Ethernet frames received at the network interface. The first filter relates to the second filter.

The Frame Capture Managing Module 120 and/or the processing module 601 and/or the sending module 620, or a further sending module (not shown), is configured for sending, to the network node 130, a response comprising a second multicast channel relating to the first multicast channel. The second multicast channel is to be joined by the network node 130, whereby the network node 130, upon joining the second multicast channel, receives a collection of Ethernet frames, indicated by the second filter, from among Ethernet frames received at the switch 110.

The second multicast channel may be the first multicast channel and the first filter may be the second filter.

The second multicast channel may be different from the first multicast channel and the first filter may be different from the second filter. The Frame Capture Managing Module 120 and/or the processing module 601 and/or the sending module 620, or a yet further sending module (not shown), may be configured for sending, to a further switch 114 being closer in terms of network topology to the network node 130, a further configuration comprising:
- the indication about the first multicast channel to be joined by the further switch 114, an indication about the second multicast channel to be used by the further switch 114, and the information relating to the second filter.

The Frame Capture Managing Module 120 and/or the processing module 601 and/or the obtaining module 630 may be configured for obtaining a list of identities of the network interfaces NI-1 . . . NI-n of the switch 110.

Moreover, the Frame Capture Managing Module 120 and/or the processing module 601 and/or the receiving module 610, or a further receiving module (not shown), may be configured for receiving, from the network node 130, a request for a set of identities of the network interfaces NI-1 . . . NI-n of the switch 110.

Furthermore, the Frame Capture Managing Module 120 and/or the processing module 601 and/or the sending module 620, or a still further sending module (not shown), may be configured for sending, to the network node 130, the set of identities. The set of identities comprises one or more of the identities of the list.

In some embodiments, the Frame Capture Managing Module 120 and/or the processing module 601 and/or the generating module 640 may be configured for generating the set of identities based on access rights of the network node 130. The access rights concerns right to access the network interfaces.

Moreover, the Frame Capture Managing Module 120 and/or the processing module 601 and/or the determining module 650 may be configured for determining the second multicast channel based on the identity of the network interface and the information relating to the filter.

The first multicast channel may comprise a first multicast IP address and the second multicast channel may comprise a second multicast IP address.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

What is claimed is:

1. A method, performed by a switch, for managing Ethernet frames, the method comprising:
    in response to a Frame Capture Managing Module (FCMM) receiving a list of identities of a plurality of network interfaces of the switch, in order for the FCMM to select an identity of a network interface of the plurality of network interfaces of the switch, receiving a configuration from the FCMM comprising:
        the identity of the network interface of the switch for receiving Ethernet frames;
        an indication of a first multicast channel; and
        information relating to a first filter to be applied, by the switch, to the Ethernet frames received at the network interface;
    receiving a request for the Ethernet frames via the first multicast channel;
    receiving the Ethernet frames at the network interface;
    filtering, by use of the first filter, the Ethernet frames into a collection of filtered Ethernet frames; and
    sending externally to the switch, to another switch or router, the collection of the filtered Ethernet frames via the first multicast channel.

2. The method according to claim 1, wherein the first multicast channel comprises a first multicast IP address.

3. The method according to claim 1, wherein the switch receives the request for the Ethernet frames from the other switch or the router.

4. The method according to claim 1, wherein the collection of the filtered Ethernet frames is further filtered by a second filter at the other switch or the router, in which the second filter relates to the first filter.

5. The method according to claim 1, wherein the collection of the filtered Ethernet frames is further filtered by a second filter at the other switch or the router, in which the second filter relates to the first filter, and wherein the collection of the filtered Ethernet frames further filtered by the second filter are sent from the other switch or the router via a second multicast channel.

6. A switch configured for managing Ethernet frames, the switch comprising:
    a processing circuit; and
    a memory containing instructions which, when executed by the processing circuit, cause the switch to:
        in response to a Frame Capture Managing Module (FCMM) receiving a list of identities of a plurality of network interfaces of the switch, in order for the FCMM to select an identity of a network interface of the plurality of network interfaces of the switch, receive a configuration from the FCMM comprising:
            the identity of the network interface of the switch for receiving Ethernet frames;
            an indication of a first multicast channel; and
            information relating to a first filter to be applied, by the switch, to the Ethernet frames received at the network interface;
        receive a request for the Ethernet frames via the first multicast channel;
        receive the Ethernet frames at the network interface;
        filter, by use of the first filter, the Ethernet frames into a collection of filtered Ethernet frames; and
        send externally to the switch, to another switch or router, the collection of the filtered Ethernet frames via the first multicast channel.

7. The switch according to claim 6, wherein the first multicast channel comprises a first multicast IP address.

8. The switch according to claim 6, wherein the switch receives the request for the Ethernet frames from the other switch or the router.

9. The switch according to claim 6, wherein the collection of the filtered Ethernet frames is further filtered by a second filter at the other switch or the router, in which the second filter relates to the first filter.

10. A non-transitory computer-readable storage medium comprising instructions which, when executed by a processor of a switch for managing Ethernet frames, are capable of causing the switch to perform operations comprising:
    in response to a Frame Capture Managing Module (FCMM) receiving a list of identities of a plurality of network interfaces of the switch, in order for the FCMM to select an identity of a network interface of the plurality of network interfaces of the switch, receiving from the FCMM a configuration comprising:
        the identity of the network interface of the switch for receiving Ethernet frames;
        an indication of a first multicast channel; and
        information relating to a first filter to be applied, by the switch, to the Ethernet frames received at the network interface;
    receiving a request for the Ethernet frames via the first multicast channel;
    receiving the Ethernet frames at the network interface;
    filtering, by use of the first filter, the Ethernet frames into a collection of filtered Ethernet frames; and
    sending externally to the switch, to another switch or router, the collection of the filtered Ethernet frames via the first multicast channel.

11. The non-transitory computer-readable storage medium according to claim 10, wherein the first multicast channel comprises a first multicast IP address.

12. The non-transitory computer-readable storage medium according to claim 10, wherein the switch receives the request for the Ethernet frames from the other switch or the router.

13. The non-transitory computer-readable storage medium according to claim 10, wherein the collection of the filtered Ethernet frames is further filtered by a second filter at the other switch or the router, in which the second filter relates to the first filter.

14. The non-transitory computer-readable storage medium according to claim 10, wherein the collection of the filtered Ethernet frames is further filtered by a second filter at the other switch or the router, in which the second filter relates to the first filter, and wherein the collection of the filtered Ethernet frames further filtered by the second filter are sent from the other switch or the router via a second multicast channel.

\* \* \* \* \*